US012674922B2

(12) United States Patent (10) Patent No.: US 12,674,922 B2
D'Aleo et al. (45) Date of Patent: Jul. 7, 2026

(54) OPTICAL MODULE

(71) Applicant: ams-OSRAM Asia Pacific Pte. Ltd., Singapore (SG)

(72) Inventors: Francesco Paolo D'Aleo, Samstragern (CH); Jens Geiger, Thalwil (CH)

(73) Assignee: AMS-OSRAM AISA PACIFIC PTE. LTD., Singapore (SG)

( * ) Notice: Subject to any disclaimer, the term of this patent is extended or adjusted under 35 U.S.C. 154(b) by 449 days.

(21) Appl. No.: 18/276,711

(22) PCT Filed: Dec. 20, 2021

(86) PCT No.: PCT/SG2021/050803

§ 371 (c)(1),
(2) Date: Aug. 10, 2023

(87) PCT Pub. No.: WO2022/173365

PCT Pub. Date: Aug. 18, 2022

(65) Prior Publication Data

US 2024/0118467 A1 Apr. 11, 2024

(30) Foreign Application Priority Data

Feb. 12, 2021 (GB) ...................................... 2102024

(51) Int. Cl.
*G02B 5/20* (2006.01)
*G02B 5/22* (2006.01)
(Continued)

(52) U.S. Cl.
CPC ............. *G02B 5/207* (2013.01); *G02B 5/203* (2013.01); *G02B 5/208* (2013.01); *G02B 5/223* (2013.01); *G02B 5/281* (2013.01); *G02B 27/60* (2013.01)

(58) Field of Classification Search
None
See application file for complete search history.

(56) References Cited

U.S. PATENT DOCUMENTS 9,172,850 B2    10/2015  Ludwig
11,563,131 B2 *  1/2023  Uedaira  ................ H10F 39/806
(Continued)

FOREIGN PATENT DOCUMENTS

JP       H11316309 A    11/1999
JP       2011107321 A    6/2011
(Continued)

OTHER PUBLICATIONS

Request for the Submission of an Opinion (English translation) issued in corresponding South Korean patent application No. 10-2023-7028301 issued on May 1, 2025, 7 pages (for reference purpose only).

(Continued)

*Primary Examiner* — Robert E. Tallman
(74) *Attorney, Agent, or Firm* — VIERING, JENTSCHURA & PARTNER mbB

(57) ABSTRACT

An optical module includes a display including light emitting elements that emit visible light. The optical module also includes an image sensor layer including infra-red light sensitive elements. The optical module further includes a mask layer configured to block infra-red light having a wavelength in one or more portions of the infra-red optical spectrum and pass visible light. The optical module is lensless.

19 Claims, 8 Drawing Sheets

500

108

402

(51) Int. Cl.
    *G02B 5/28*          (2006.01)
    *G02B 27/60*         (2006.01)

(56)                    References Cited

U.S. PATENT DOCUMENTS

| | | | |
|---|---|---|---|
| 2010/0148291 A1* | 6/2010 | Tivarus | H10F 39/199 |
| | | | 257/E31.127 |
| 2011/0019056 A1* | 1/2011 | Hirsch | H04N 5/2226 |
| | | | 348/333.01 |
| 2011/0134249 A1* | 6/2011 | Wood | G05D 1/106 |
| | | | 348/E5.09 |
| 2014/0036168 A1 | 2/2014 | Ludwig | |
| 2017/0060242 A1* | 3/2017 | Gill | G02B 5/1871 |
| 2017/0091506 A1 | 3/2017 | Sinha et al. | |
| 2020/0279090 A1 | 9/2020 | He et al. | |
| 2021/0216163 A1* | 7/2021 | Wang | G02F 1/294 |
| 2024/0250199 A1 | 7/2024 | Ting et al. | |

FOREIGN PATENT DOCUMENTS

| | | |
|---|---|---|
| KR | 1020180130831 A | 12/2018 |
| KR | 1020200038853 A | 4/2020 |
| WO | 2012/040192 A1 | 3/2012 |

OTHER PUBLICATIONS

International Search Report issued for corresponding International Patent Application No. PCT/SG2021/050803 on Mar. 29, 2022 (3 pages).

Written Opinion issued for corresponding International Patent Application No. PCT/SG2021/050803 on Mar. 29, 2022 (4 pages).

Search Report issued for corresponding Great Britain Patent Application No. GB212024.3 on Nov. 23, 2021 (3 pages).

* cited by examiner

300

104
108
102

108
106
402

400

602            604

608            606

OPTICAL MODULE

CROSS REFERENCE TO RELATED APPLICATION

This application is a National Stage of International Application No. PCT/SG2021/050803, filed on Dec. 20, 2021, which designates the United States and was published in English, and which claims priority to Great Britain Patent Application No. 2102024.3, filed on Feb. 12, 2021, in the Great Britain Patent Office. All of the aforementioned applications are hereby incorporated by reference in their entireties.

TECHNICAL FIELD

This disclosure relates to an optical module, in particular a lensless optical module.

BACKGROUND

Mobile communications devices, such as smart phones, tablets, laptop computers, and other portable computing devices, can include technologies to record three-dimensional images, sense motion and/or gestures. Digital recording methods use various types of miniature optical modules, which interact with cameras to record dynamical events in three-dimensional regions. These optical modules can be of various forms and deliver different types of functions.

In order to create a device that can display information and at the same time allow interaction with it, it is needed to integrate a display with a camera. Bidirectional displays are known which are capable of both image capture and display. Some known bidirectional displays use LCD displays, which alternate between its traditional role in forming the displayed image and acting as an optical mask. Other bidirectional displays use small apertures integrated on the sub-pixels of the display.

SUMMARY

There are a number of difficulties faced with the design of bidirectional displays.

If no optics are used, the camera cannot function properly (the intensity of the incoming optical ray but also its direction, as angle sensitive pixels would be needed). Furthermore, if optics such as lens arrays are placed at the top of the display the view will be distorted. If refractive optics are placed below the display and positioned between the display and an image sensor, the thickness of the device is increased (because of the lenses) and this solution limits the focus at a fixed distance. If a mask (like a coded one) is placed at the surface the display can be partially obscured.

Known techniques which use LCD displays alternating between masking and displaying require complex processing to control the switching between a display mode and an imaging mode. Known techniques which integrate small apertures on the sub-pixels of the display are costly in terms of production and pixel assembly especially when more complex mask patterns are required (e.g. URA masks). A classical lens approach would obviously distort the information displayed. Other solutions implementing broadband coded or diffraction masks would also affect the visible wavelength, obscuring and distorting the visual information or being angle sensitive such as a specific thin layer composition. Multiple alternating refractive index filters can be thick resulting in undesirably sized optical modules The present disclosure addresses the need to acquire images and at the same time not occlude the line of sight between the user and the displayed information.

According to one aspect of the present disclosure there is provided an optical module comprising: a display comprising light emitting elements that emit visible light; an image sensor layer comprising infra-red light sensitive elements; and a mask layer configured to block infra-red light having a wavelength in one or more portions of the infra-red optical spectrum and pass visible light.

In this way there is no preferential angle of incidence as compared to the known techniques of using multiple layers of refractive index based mirrors. That is, the mask layer provides narrow and specific blocking characteristics in the infrared spectrum and is angle insensitive. The mask layer may block wavelengths of infrared light in a blocking wavelength band corresponding to wavelengths of infrared light emitted by an optical emitter that is within the vicinity of the image sensor layer. That is, the mask layer prevents the infra-red light sensitive elements of the image sensor from being blinded by stray light emitted by the optical emitter An optical signal coming from object reflection is preprocessed by the mask layer and then captured by the infra-red light sensitive elements of the image sensor layer leaving the displayed image undisturbed. That is, the display functionalities are not jeopardized by optical distortion.

In some implementations, the optical module is lensless (i.e. no lenses are present in the optical module) so that the optical module can advantageously be made thinner (1~2 µm) than known optical modules using multiple layer filters (~10 µm) such that it suitable for incorporation into communications devices such as smart phones, tablets, laptop computers, and other portable computing devices.

In some implementations, the optical module further comprises a substrate transparent to visible light and infra-red light in one or more further portions of the infra-red optical spectrum, the substrate supporting the mask layer. The substrate may be made of glass.

In other implementations, the display is supported by an upper surface of the image sensor layer, and the mask layer is supported by an upper surface of the display. In other implementations, the mask layer is supported by an upper surface of the image sensor layer, and the display is supported by an upper surface of the mask layer. The absence of a substrate advantageously reduces the thickness of the optical module. Furthermore, the small mask layer to image sensor distances expands the field of view associated with the image sensor degrading the pixel/degree resolution In implementations whereby the optical module further comprises the substrate transparent to visible light, the display may be supported by an upper surface of the image sensor layer, and the substrate is supported by an upper surface of the display. To reduce the thickness of the optical module, in implementations whereby the optical module further comprises the substrate transparent to visible light the image sensor layer may be integrated with the display to form an integrated optical layer and the substrate is supported by an upper surface of the integrated optical layer.

In some implementations, the image sensor layer is integrated with the display to form an integrated optical layer, and the mask layer is supported by an upper surface of the integrated optical layer. These implementations reduce the thickness of the optical module by the absence of the substrate and the integration of the image sensor layer and the display.

The mask layer may comprise a dye-based polymer that is deposited in a predetermined pattern. In these embodiments, the mask layer can be patterned using standard photolithographic techniques.

The dye-based polymer may be deposited as a set of pinholes, a spatial filter defining a coded aperture, in a Moiré pattern, or a diffractive pattern.

Alternatively, the mask layer may comprise a plurality of components electronically controllable to block said light having a wavelength in one or more portions of the infra-red optical spectrum and pass said light having a wavelength in remaining portions of the infra-red optical spectrum. The plurality of components may be vanadium oxide transistors.

The infra-red light sensitive elements may be configured to capture an image of a scene disposed in front of the display, and the optical module further comprises a processor which is configured to determine depth information relating to each of one or more regions of the scene based at least in part on the captured image and knowledge of a configuration of the mask layer. The acquired image can be used for ranging, 3D reconstruction and/or gesture recognition depending on the mask applied.

The display may comprise a light emitting diode (LED) display such as an organic light emitting diode (OLED) display or a microLED display.

Preferably, the optical module is lensless.

The infra-red light sensitive elements may be coated with a coating which passes infra-red light and absorbs visible light.

According to another aspect of the present disclosure there is provided a device comprising: an optical emitter configured to emit light having a wavelength in one or more portions of the infra-red optical spectrum; and an optical module comprising: a display comprising light emitting elements that emit visible light; an image sensor layer comprising infra-red light sensitive elements; and a mask layer configured to block infra-red light having a wavelength in said one or more portions of the infra-red optical spectrum and pass visible light.

At least one of the optical emitter and the infra-red light sensitive elements may be coated with a coating which passes infra-red light and absorbs visible light.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE PREFERRED EMBODIMENTS

Some embodiments of the disclosure will now be described by way of example only and with reference to the accompanying figures, in which.

DETAILED DESCRIPTION OF THE PREFERRED EMBODIMENTS

Embodiments will now be described by way of example only with reference to the accompanying figures.

In embodiments of the present disclosure the optical module comprises a display 104 comprising light emitting elements that emit visible light; an image sensor layer 102 comprising infra-red (IR) light sensitive elements; and a mask layer 108 configured to block infra-red light having a wavelength in one or more portions of the infra-red optical spectrum and pass visible light. These components may be arranged in different ways which will be described below with reference to FIGS. 1-5.

Figure 1:
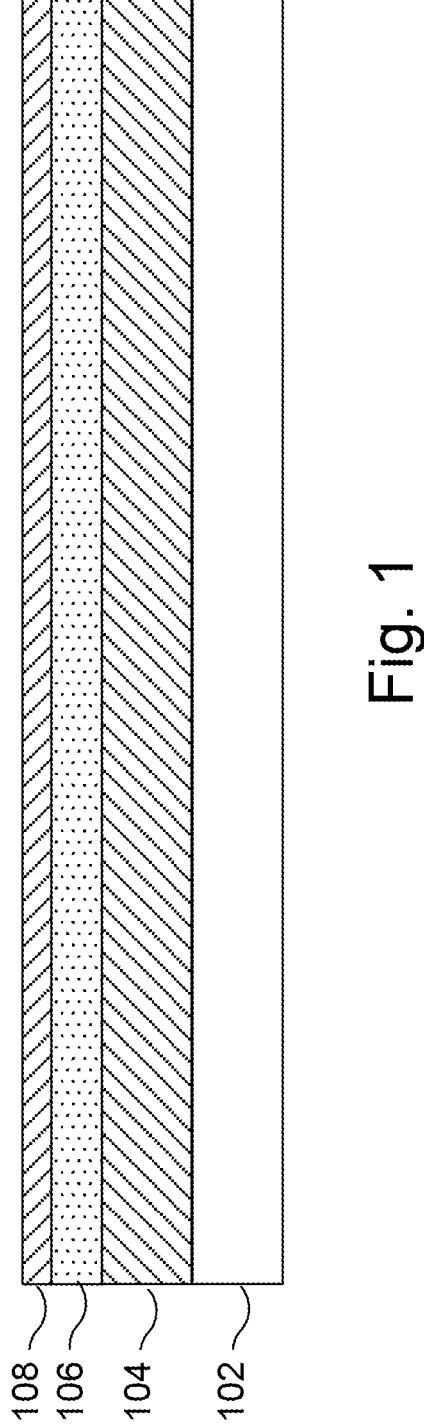
FIG. 1 illustrates an optical module according to an embodiment of the present disclosure.

FIG. 1 illustrates one example of an optical module 100.

As shown in FIG. 1, as a first bottom layer the image sensor layer 102 is provided.

The image sensor layer 102 comprises one or more infra-red light sensitive elements. The infra-red light sensitive elements are photosensitive elements each of which is operable to produce a signal in response to a received dose of infrared radiation. That is, the infra-red light sensitive elements convert received infrared radiation into electrical signals. Various different types of infra-red light sensitive elements are known to persons skilled in the art, for example photodiodes. The infra-red light sensitive elements may be based on an active-pixel sensor technology and may comprise, for example, an array of complimentary metal-oxide semiconductor (CMOS) pixels. The image sensor layer 102 is configured to output captured image data. For example the image sensor layer 102 may be coupled to a processing unit (not shown in FIG. 1) for processing the captured image data, the processing unit may be incorporated into the optical module 100 or be external to the optical module 100.

The infra-red light sensitive elements may be configured to capture an image of a scene disposed in front of the display, and the processing unit may be configured to determine depth information relating to each of one or more regions of the scene based at least in part on the captured image and knowledge of the configuration of the mask layer 108. The acquired image can be used for ranging, 3D reconstruction and/or gesture recognition depending on the mask applied.

We refer herein to infra-red light as being in the 700 nm-1 mm range. The infra-red light sensitive elements may be near infra-red (NIR) light sensitive elements. We refer NIR light being in the 700-2500 nm range. In these embodiments, for the infra-red light sensitive elements it possible to use silicon, Si, (700-1150 nm); indium gallium arsenide, InGaAs, (~1600 nm); or germanium, Ge, and germanium-tin (1.4 um-2.4 um) based light sensitive elements.

In the optical module 100, the display 104 is mounted to an upper surface of the image sensor layer 102. The display 104 comprises light emitting elements that emit visible light. We refer herein to visible light as being in the 380-700 nm range. The display may comprise a light emitting diode (LED) display such as an organic light emitting diode (OLED) display or a microLED display. The display 104 is configured to be controlled by a processing unit (not shown in FIG. 1), the processing unit may be incorporated into the optical module 100 or be external to the optical module 100. The processing unit configured to control the display may be the same as, or different to the processing unit referred to above that processes the captured image data.

In the optical module 100, a substrate is mounted to an upper surface of the display 104. The substrate is transmissive of visible light such that light emitted by the display 104 may pass through it. The substrate preferably comprises glass. However, other materials are suitable, for example plastic. In some embodiments, the substrate can comprise SiO₂ or "display" glass, such as Schott D263T-ECO or Borofloat 33, Dow-Corning Eagle 2000.

In the optical module 100, the substrate supports a mask layer 108. The mask layer 108 is configured to block wavelengths of infrared light in one or more blocking wavelength bands that is incident on the upper surface of the mask layer 108. The mask layer 108 is transmissive of visible light such that visible light emitted by the display 104 may pass through it.

The substrate 106 is transmissive of remaining portions of infra-red light (infrared light having wavelengths outside of the one or more blocking wavelength bands) such that this infra-red light may pass through the mask layer 108, the substrate 106 and the display 104 to then be incident on the infra-red light sensitive elements of the image sensor layer 102.

Figure 2:
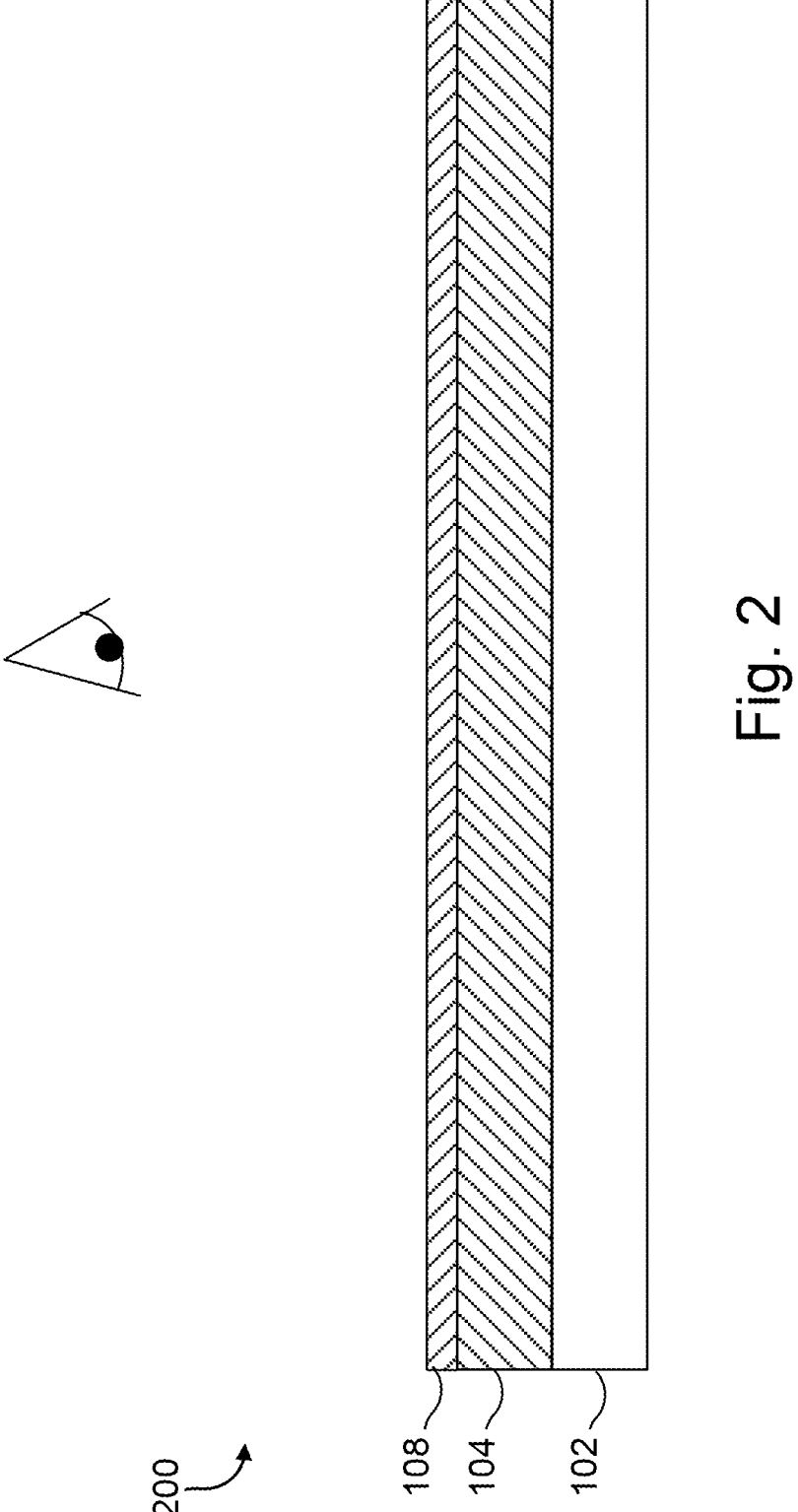
FIG. 2 illustrates an optical module according to another embodiment of the present disclosure.

FIG. 2 illustrates another example of an optical module 200.

The optical module 200 shown in FIG. 2 differs from the optical module 100 in that the substrate 106 is not present. In the example of FIG. 2, the mask layer 108 is mounted to the upper surface of the display 104. That is, the display 104 directly supports the mask layer 108.

Figure 3:
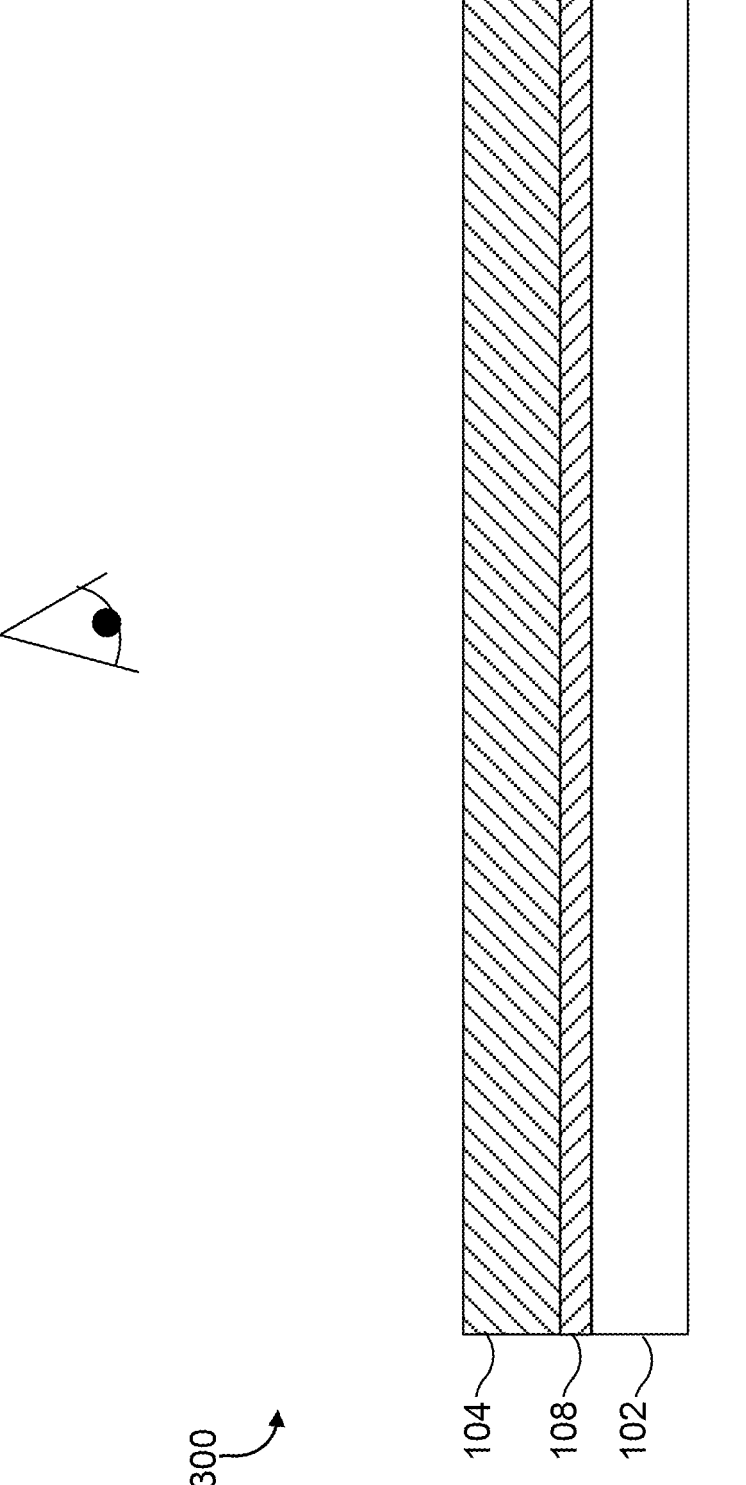
FIG. 3 illustrates an optical module according to another embodiment of the present disclosure.

FIG. 3 illustrates another example of an optical module 300.

The substrate 106 is also not present in the optical module 300. The optical module 300 shown in FIG. 3 differs from the optical module 200 in that the mask layer 108 is mounted to the upper surface of the image sensor layer 102 instead of being mounted to the upper surface of the display 104. That is, the mask layer 108 is provided between the image sensor layer 102 and the display 104.

Figure 4:
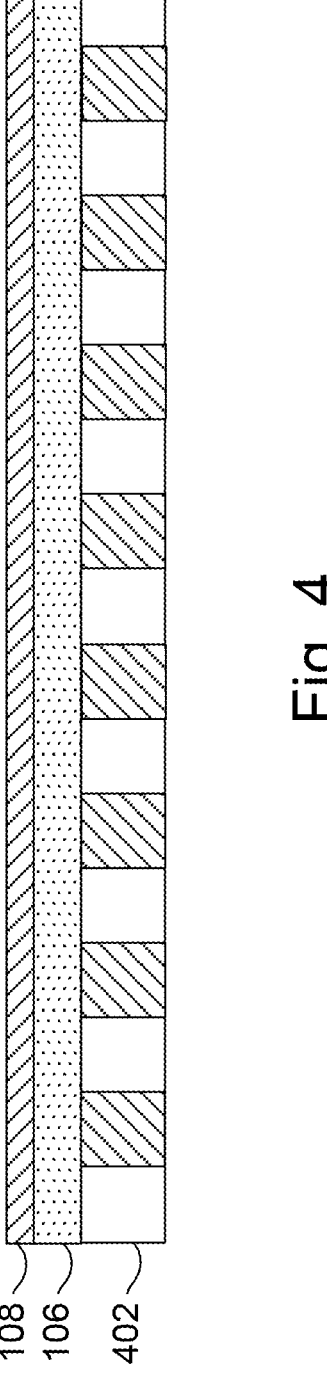
FIG. 4 illustrates an optical module according to another embodiment of the present disclosure.

FIG. 4 illustrates another example of an optical module 400.

Whilst FIGS. 1-3 show the display 104 and the image sensor layer 102 a being separate layers, in the optical module 400 an integrated optical layer 402 is provided. The integrated optical layer 402 performs both visible light emission and infra-light detection. That is, the infra-red light sensitive elements of the image sensor layer 102 described above, are integrated with the light emitting elements of the display 104 described above, in the integrated optical layer 402.

As shown in FIG. 4, the substrate 106 is mounted to the upper surface of the integrated optical layer 402. The mask layer 108 is mounted to the upper surface of the substrate 106.

Figure 5:
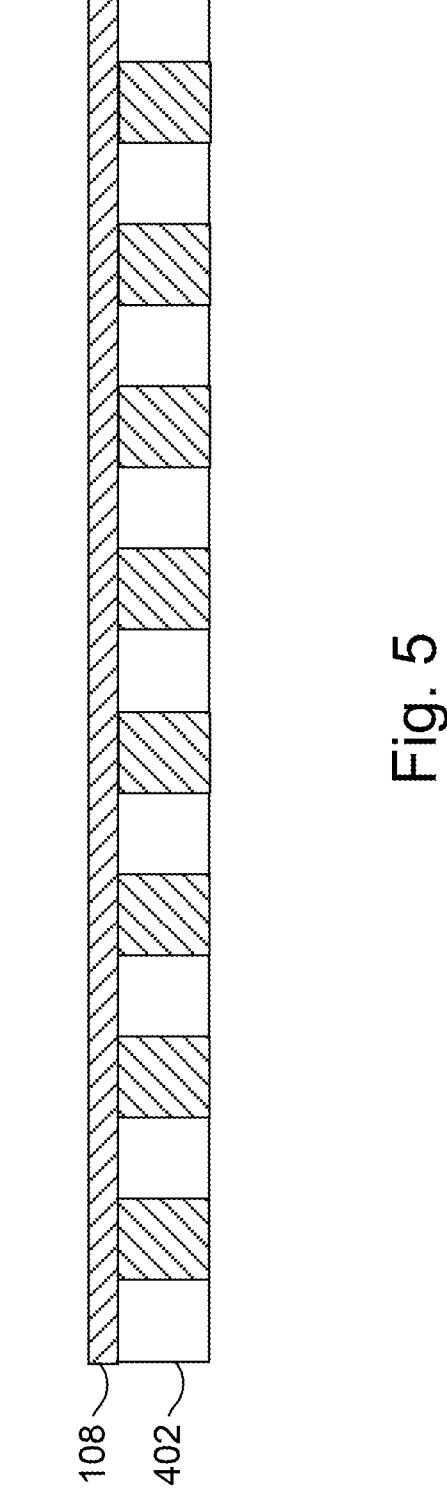
FIG. 5 illustrates an optical module according to another embodiment of the present disclosure.
Figure 5:

FIG. 5 illustrates another example of an optical module 500.

The optical module 500 shown in FIG. 5 differs from the optical module 400 in that the substrate 106 is not present. In the example of FIG. 5, the mask layer 108 is mounted to the upper surface of the integrated optical layer 402. That is, the integrated optical layer 402. directly supports the mask layer 108.

In all of the implementations described above, the mask layer 108 limits the stray light. Therefore, the mask layer 108 prevents the infra-red light sensitive elements being blinded from light rays that follow paths other than those that are intended. The mask layer 108 passes some infrared light (including infrared light having wavelengths inside and outside of the one or more blocking wavelength bands) that does not affect performance of the image sensor layer 102. In particular, the mask layer 108 passes infrared light through openings in the mask layer 108 which is incident on the mask layer 108 at angles allowed by the field of views of the openings.

In all of the implementations described above, the optical module may be lensless (i.e. no lenses are present in the optical module).

The mask layer 108 may be implemented in various ways.

In some embodiments the mask layer 108 comprises a dye-based polymer. In particular, the mask layer 108 comprises a dye that is dispersed on a supporting polymer. In these embodiments the dye-based polymer block wavelengths of infrared light in one or more blocking wavelength bands by way of absorption of the of the infrared light. It is the dye that has the blocking properties and the dye particles are angle insensitive, the polymer is used to carry the dye and pattern it via photolithographic techniques. The dye-based polymer is deposited in a predetermined pattern. The dye-based polymer may be patterned using standard photolithographic techniques comprising masking, UV exposure and development via solvents. It will be appreciated that embodiments extend to other methods of patterning the dye-based polymer.

The dye-based polymer may have a blocking bandwidth band centered at ~954 nm and 178 nm wide. The dye-based polymer may have a blocking bandwidth band centered at ~845 nm and 186 nm wide. The dye-based polymer may have a blocking bandwidth band centered at ~845 nm and 86 nm wide.

Figure 6A:
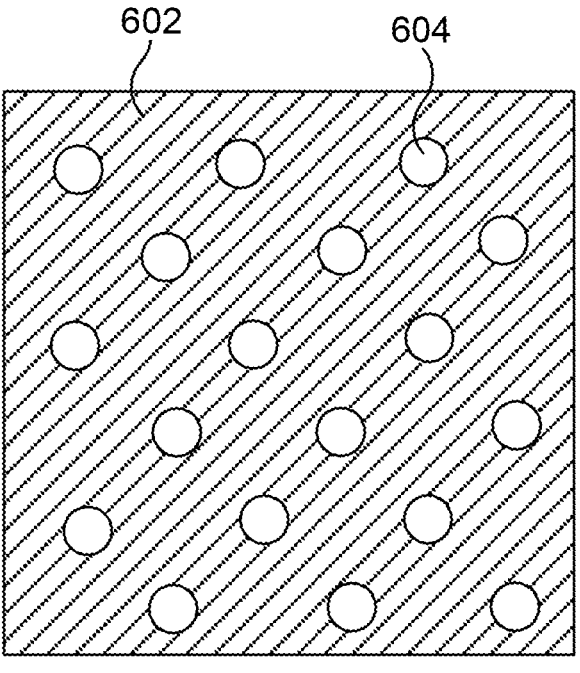
FIG. 6a illustrates a dye-based polymer mask layer deposited as a set of pinholes.

The dye-based polymer may be deposited as a set of pinholes as illustrated in FIG. 6a. FIG. 6a illustrates a front view of the mask layer 108 whereby areas 602 of the dye-based polymer pass visible light and block wavelengths of infrared light in one or more blocking wavelength bands that is incident on the upper surface of the mask layer 108. A set of pinholes 604 are provided which are transparent to both visible and infra-red light.

Figure 6B:
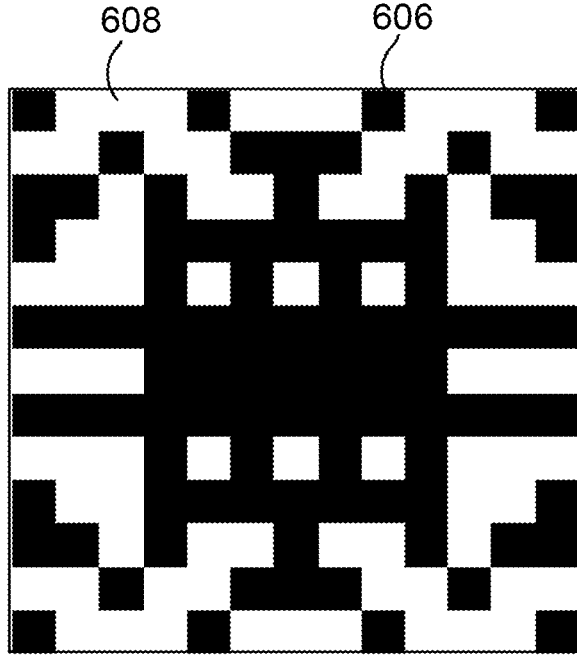
FIG. 6b illustrates a dye-based polymer mask layer deposited as a spatial filter defining a coded aperture.

The dye-based polymer may be deposited as spatial filter defining a coded aperture as illustrated in FIG. 6b. FIG. 6b illustrates a front view of the mask layer 108 whereby areas 606 of the dye-based polymer pass visible light and block wavelengths of infrared light in one or more blocking wavelength bands that is incident on the upper surface of the mask layer 108. As a mere example, FIG. 6b shows a 13×13 array of binary spatial filter pixels, wherein the array of binary spatial filter pixels defines a coded aperture. Specifically, the spatial filter 118 includes a 13×13 array of binary spatial filter pixels including a plurality of spatial filter pixels 606 which pass visible light and block wavelengths of infrared light in one or more blocking wavelength bands, and a plurality of gaps or transparent spatial filter pixels 608 transparent to both visible and infra-red light, wherein the plurality of gaps or transparent spatial filter pixels 608 defines a geometry of the coded aperture.

Figures 6C, 6D:
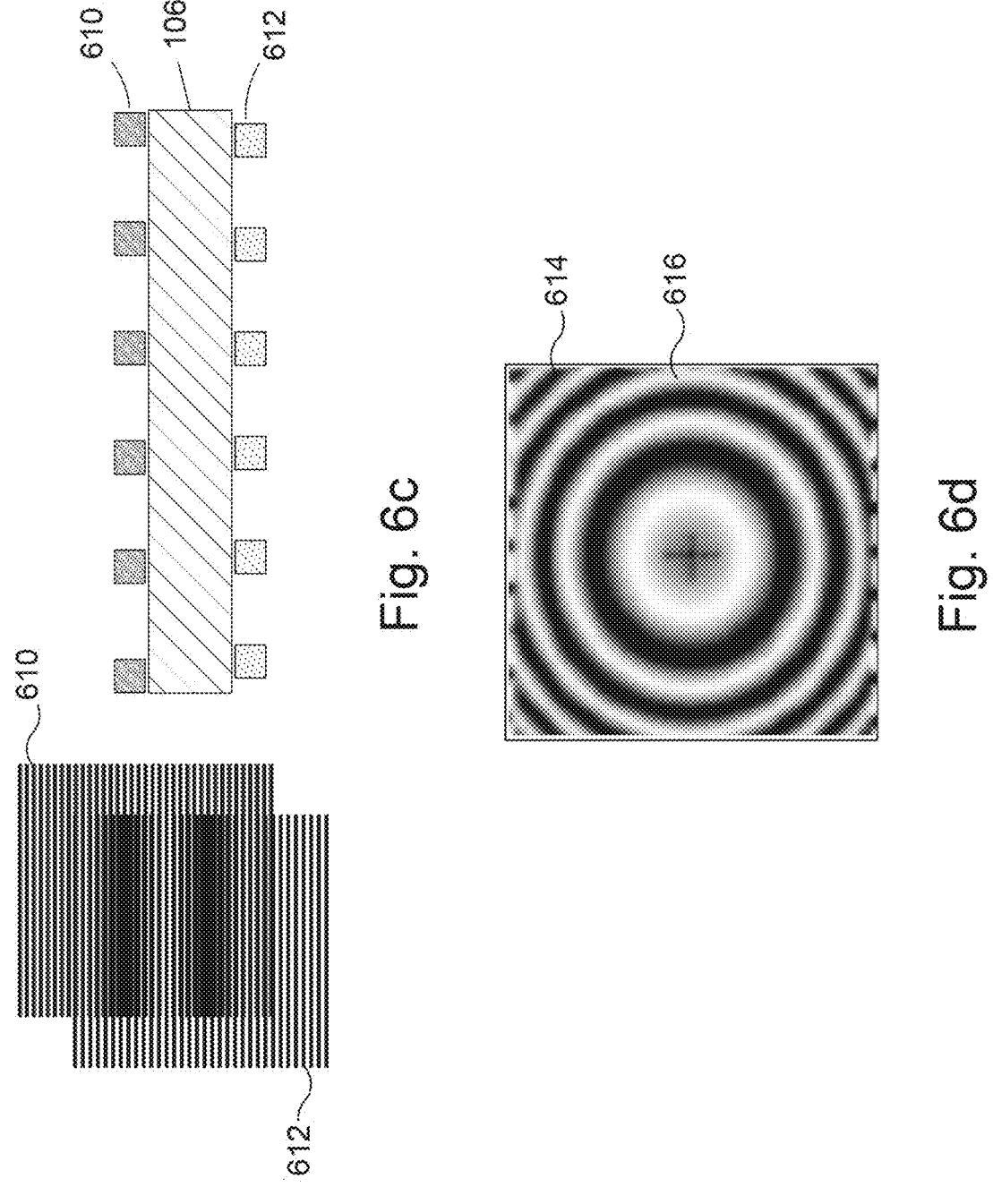
FIG. 6c illustrates a dye-based polymer mask layer deposited in a Moiré pattern.
FIG. 6d illustrates a dye-based polymer mask layer deposited in a diffractive pattern.

The dye-based polymer may be deposited in a Moiré pattern as illustrated in FIG. 6c. As shown in FIG. 6c, the dye-based polymer may be deposited on the upper surface of the substrate 106 in a first set of lines 610 which pass visible light and block wavelengths of infrared light in one or more blocking wavelength bands that is incident on the upper surface of the mask layer 108. Gaps between the first set of lines 610 are transparent to both visible and infra-red light. In addition the dye-based polymer may be deposited on the lower surface of the substrate 106 in a second set of lines 612 which pass visible light and block wavelengths of infrared light in one or more blocking wavelength bands that is incident on the upper surface of the mask layer 108. Gaps between the second set of lines 612 are transparent to both visible and infra-red light. The second set of lines 612 may be slightly offset from the first set of lines 610 as shown in FIG. 6*c* to create the Moiré pattern. Embodiments extend to other methods of creating a Moiré pattern using the first set of lines 610 and the second set of lines 612. Whilst FIG. 6*c* illustrates straight lines, additionally or alternatively curved (or other shaped) lines of the dye-based polymer may be used. It will be appreciated that whilst FIG. 6*c* illustrates the dye-based polymer being deposited on surfaces of the substrate 106, this is merely an example. Embodiments where the dye-based polymer is deposited in a Moiré pattern are not limited to embodiments where the substrate 106 is present in the optical module, and are also applicable to embodiments where the substrate 106 is present the optical module.

The dye-based polymer may be deposited in a diffractive pattern as illustrated in FIG. 6*d*. FIG. 6*d* illustrates a front view of the mask layer 108 whereby areas 614 of the dye-based polymer pass visible light and block wavelengths of infrared light in one or more blocking wavelength bands that is incident on the upper surface of the mask layer 108, and gaps 616 between the areas 614 are transparent to both visible and infra-red light.

Embodiments are not limited to the mask layer 108 comprises a dye-based polymer. In alternative embodiments, the mask layer 108 comprise a plurality of components electronically controllable to pass visible light and block wavelengths of infrared light in one or more blocking wavelength bands that is incident on the upper surface of the mask layer 108 (and pass infrared light having wavelengths outside of the one or more blocking wavelength bands). The plurality of components are controlled by a processing unit to make similar patterns as shown in FIGS. 6*a-d* by way of delivering voltage signals to selected components. The plurality of components may be vanadium oxide transistors (e.g. vanadium dioxide ($VO_2$) transistors), however other electronic components exhibiting these properties may also be used.

Figure 7:
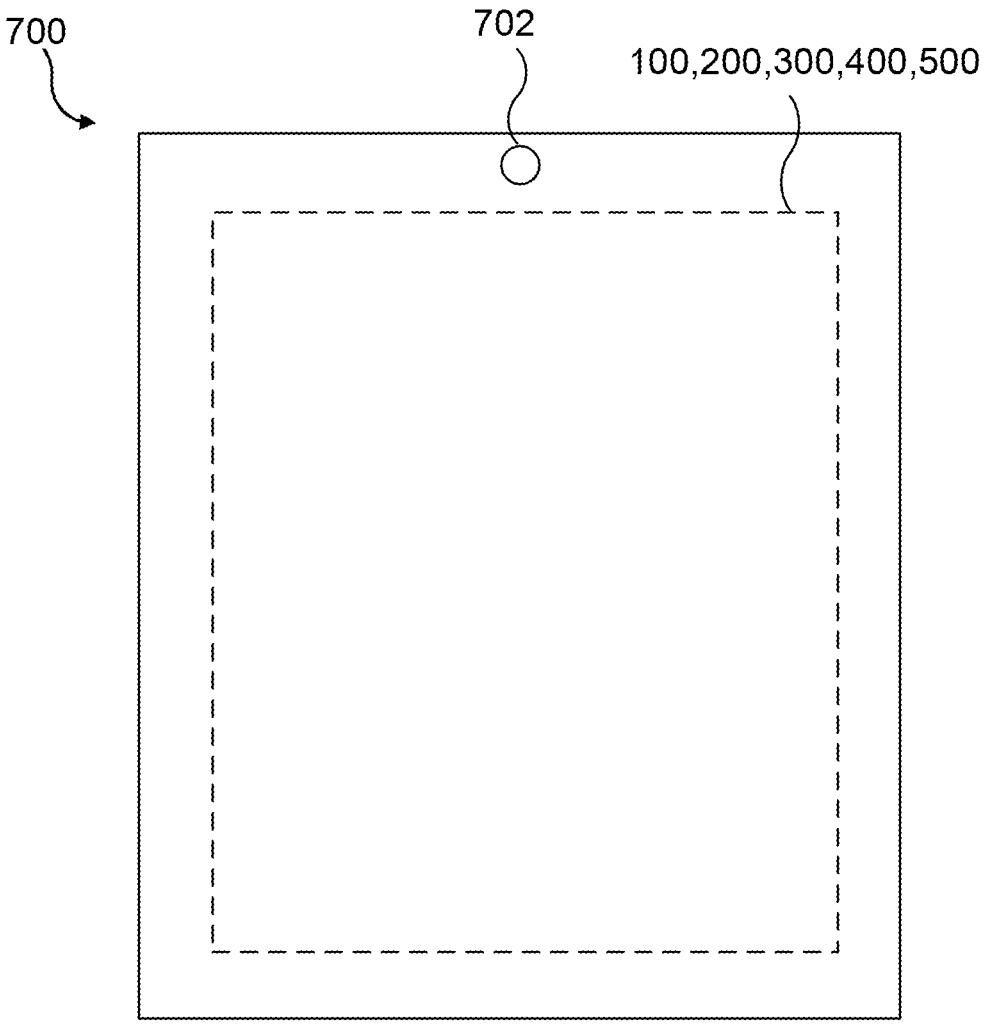
FIG. 7 illustrates a computing device comprising the optical module described herein.

The optical module described above may be incorporated into a computing device as illustrated in FIG. 7.

FIG. 7 illustrates a computing device 700 comprising the optical module according to any of the embodiments described herein.

The computing device 700 may be mobile computing device e.g. a smartphone, a tablet device, a laptop computer, a gaming device etc. The computing device 700 may be a wearable device (e.g. a smartwatch or wrist band). The computing device 700 may be a display device. It will be appreciated that the optical module 100 according to any of the embodiments described herein may be incorporated into other types of computing device not referred to herein.

The computing device 700 comprises one or more optical emitter 702 and the optical module according to any of the embodiments described herein.

The optical emitter 702 may comprise one or more light emitting diodes (LEDs), lasers, or other devices. In some embodiments, the optical emitter 702 comprises one or more vertical-cavity surface-emitting lasers (VCSELs). The optical emitter 702 is configured to emit infrared light such as near-infrared radiation. The optical emitter 702 may be configured to emit only infrared light. In other implementations the optical emitter 702 may be configured to additionally emit light having a wavelength outside of the infrared wavelength range.

The optical emitter 702 is configured to emit infrared light having wavelengths in an infra-red emission band and the mask layer 108 is configured to block the wavelengths of infrared light in this emission band. That is the blocking wavelength band associated with the mask layer 108 corresponds to the infra-red emission band of the optical emitter 702.

The infra-red components referred to herein (e.g. the infra-red light sensitive elements of the image sensor layer 102 and/or optical emitter 702 may be coated with a coating which passes infra-red light but which is highly absorbing in the visible wavelength range. That is, the coating blocks visible light. In particular, the coating may have an associated cut-off wavelength of between 650-850 nm, only passing light having a wavelength above the cut-off wavelength. The coating may be an ink coating. This coating will improve the visual appearance of the infra-red components since the infra-red components are rather dark grey, not deep black that is desirable from a display background. The coating on the infra-red components will make the IR components appear deeply black in the visible while not affecting their operation in the IR.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in any embodiments, whether alone or in any appropriate combination with any other feature disclosed or illustrated herein.

LIST OF REFERENCE NUMERALS

100 optical module
102 image sensor layer
104 display
106 substrate
108 mask layer
200 optical module
300 optical module
400 optical module
402 integrated optical layer
500 optical module
602 dye-based polymer
604 gaps
606 pixels of dye-based polymer
608 gaps
610 first set of lines of dye-based polymer
612 second set of lines of dye-based polymer

614 dye-based polymer
616 gaps
700 computing device
702 optical emitter

The invention claimed is:

1. An optical module comprising:
a display comprising light emitting elements that emit visible light;
an image sensor layer comprising infra-red light sensitive elements; and
a mask layer configured to block infra-red light having a wavelength in one or more portions of the infra-red optical spectrum and pass visible light,
wherein the image sensor layer is integrated with the display to form an integrated optical layer,
wherein the integrated optical layer comprises a single substantially coplanar layer comprising the light emitting elements interleaved with the infra-red light sensitive elements, and
wherein the optical module is lensless.

2. The optical module according to claim 1, further comprising a substrate transparent to visible light and infra-red light in one or more further portions of the infrared optical spectrum, the substrate supporting the mask layer.

3. The optical module according to claim 2, wherein the mask layer is supported by the substrate.

4. The optical module according to claim 1, wherein the mask layer is supported by an upper surface of the integrated optical layer.

5. The optical module according to claim 2, wherein the substrate is supported by an upper surface of the integrated optical layer.

6. The optical module according to claim 1, wherein the mask layer is supported by an upper surface of the integrated optical layer.

7. The optical module according to claim 1, wherein the mask layer comprises a dye-based polymer deposited in a predetermined pattern.

8. The optical module according to claim 7, wherein the dye-based polymer is deposited as a set of pinholes.

9. The optical module according to claim 7, wherein the dye-based polymer is deposited as a spatial filter defining a coded aperture.

10. The optical module according to claim 7, wherein the dye-based polymer is deposited in a Moire pattern.

11. The optical module according to claim 7, wherein the dye-based polymer is deposited in a diffractive pattern.

12. The optical module according to claim 1, wherein the mask layer comprises a plurality of components electronically controllable to block said light having a wavelength in one or more portions of the infra-red optical spectrum and pass said light having a wavelength in remaining portions of the infra-red optical spectrum.

13. The optical module according to claim 12, wherein the plurality of components are vanadium oxide transistors.

14. The optical module according to claim 1, wherein the infra-red light sensitive elements are configured to capture an image of a scene disposed in front of the display, and the optical module further comprises a processor which is configured to determine depth information relating to each of one or more regions of the scene based at least in part on the captured image and knowledge of a configuration of the mask layer.

15. The optical module according to claim 1, wherein the display comprises a light emitting diode, LED, display.

16. The optical module according to claim 15, wherein the LED display is as an organic light emitting diode display or a microLED display.

17. The optical module according to claim 1, wherein the infra-red light sensitive elements are coated with a coating which passes infra-red light and absorbs visible light.

18. A device comprising:
the optical module according to claim 1; and
an optical emitter configured to emit light having a wavelength in said one or more portions of the infra-red optical spectrum.

19. The device according to claim 18, wherein at least one of the optical emitter and the infra-red light sensitive elements are coated with a coating which passes infra-red light and absorbs visible light.

* * * * *